US007744256B2

(12) United States Patent
Smester

(10) Patent No.: US 7,744,256 B2
(45) Date of Patent: Jun. 29, 2010

(54) LED ARRAY WAFER LIGHTING FIXTURE

(75) Inventor: Paul Smester, Mount Sinai, NY (US)

(73) Assignee: Edison Price Lighting, Inc., Long Island City, NY (US)

( * ) Notice: Subject to any disclaimer, the term of this patent is extended or adjusted under 35 U.S.C. 154(b) by 583 days.

(21) Appl. No.: 11/439,482

(22) Filed: May 22, 2006

(65) Prior Publication Data

US 2007/0268707 A1 Nov. 22, 2007

(51) Int. Cl.
*B60Q 3/04* (2006.01)

(52) U.S. Cl. ....................... 362/362; 362/294; 362/373; 362/382

(58) Field of Classification Search ................. 362/362, 362/357, 382, 373, 294
See application file for complete search history.

(56) References Cited

U.S. PATENT DOCUMENTS 6,787,999 B2 * 9/2004 Stimac et al. ................. 315/51
6,948,823 B2 9/2005 Pohlert et al.
7,144,140 B2 * 12/2006 Sun et al. ..................... 362/373
7,303,301 B2 * 12/2007 Koren et al. ................ 362/101
7,344,296 B2 * 3/2008 Matsui et al. ............... 362/652
2007/0041220 A1 * 2/2007 Lynch ........................ 362/646
2007/0285926 A1 * 12/2007 Maxik ........................ 362/294

FOREIGN PATENT DOCUMENTS

WO WO 2004071143 A1 * 8/2004

* cited by examiner

*Primary Examiner*—Sandra L O'Shea
*Assistant Examiner*—Evan Dzierzynski
(74) *Attorney, Agent, or Firm*—Leason Ellis LLP

(57) ABSTRACT

Presented is a lighting fixture that incorporates a LED wafer, having an array of a plurality of light-emitting LEDs, as a light source. The fixture includes a holding plate having an aperture surrounded by a flange. A heat sink includes a lamp support surface facing the holding plate and positioned opposite to the aperture. The LED wafer is mounted to the lamp support surface in a manner to assure maintenance of a thermal communication. A mounting assembly secures the LED wafer to the lamp support surface and includes a mounting clip having a spring element extending from a main portion, a lamp holder block, and an insulative isolation member.

24 Claims, 3 Drawing Sheets

LED ARRAY WAFER LIGHTING FIXTURE

FIELD OF INVENTION

The present invention relates to improvements in lighting fixtures and, in particular to a lighting fixture which utilizes an array of Light Emitting Diodes (LEDs) as a light source.

BACKGROUND OF THE INVENTION

Recessed lighting fixtures are commonly used as an effective light source. The ceiling lamp can be coupled with either a floodlight bulb for general lighting tasks, or with a spotlight bulb, which produces a relatively narrow beam of intense light, for directional lighting to highlight a subject or an otherwise unlit area. Conventionally, the prior art utilizes incandescent, fluorescent, halogen, or high intensity discharge lamp bulbs for some or all of these tasks.

A problem associated with the prior art lighting fixtures stem from the light source itself—i.e., the bulb. Incandescent bulbs use electricity to heat a filament until it glows white hot, producing light. About 90% of the electricity used by incandescent bulbs is lost as heat. Incandescent spotlight and floodlight bulbs typically burn for about two thousand hours before failing. Halogen bulbs (bulbs with a tungsten-halogen filament) produce more light, use less energy, and last longer (about three thousand hours) than the same wattage incandescent bulb, but they cost more. When configured for installation in a bulb socket, compact fluorescent bulbs have an advantage over incandescent and halogen bulbs. Such fluorescent bulbs provide light comparable to an incandescent bulb, can last ten thousand hours, and do so while consuming a quarter of the energy. Also available are incandescent bulbs which have longer life, but at a higher cost. These longer life incandescent bulbs also use more energy than a conventional incandescent bulb.

Missing from the art is a lighting fixture which accommodates a highly efficient lighting source which lasts longer than the prior art bulbs, where the fixture incorporates mechanisms for easy replacement of the light source. The present invention can satisfy one or more of these and other needs.

SUMMARY OF THE INVENTION

The present invention relates to lighting fixtures that incorporate a LED wafer array with a plurality of light-emitting LEDs as a light source. In accordance with one aspect of the invention, the lighting fixture has a holding plate which includes an aperture surrounded by a flange. A heat sink is mounted to the holding plate by at least one mounting bracket. The heat sink includes a lamp support surface on a surface of the heat sink facing the holding plate. The lamp support surface is positioned opposite to the aperture, and the LED wafer is mounted to the heat sink at the lamp support surface. The LED wafer is in thermal communication with the lamp support surface.

In another aspect of the invention, a reflector is positioned over the LED wafer so as to direct and focus the emitted light.

In a further aspect of the invention, the lighting fixture includes a LED wafer mounting assembly that secures the LED wafer to the lamp support surface, and assures that a solid thermal contact is maintained between the heat sink and the underside of the LED wafer. The mounting assembly includes a mounting clip with a main portion and a spring element extending from the main portion, a lamp holder block, and an insulative isolation member. The mounting clip main portion secures a first edge of the LED wafer to the lamp support surface, the spring element applies pressure against the LED wafer in a direction towards the heat sink, and the lamp holder block, with the isolation member positioned between the block and the LED wafer, secures a second edge of the LED wafer to the lamp support surface. In a further embodiment, the mounting clip also supports a lens over the LED wafer, where the lens acts to modify the lamp's light distribution pattern.

In yet a further aspect of the invention, the isolation member includes a wiring channel through which passes a lamp cord having two wires that are in electrical contact with terminal pads on the LED wafer, where the wires are held in place by a compressive force exerted by the combination of the lamp holder block and the isolation member.

In accordance with another aspect of the invention, the reflector has a shielding angle θ measured with respect to a central longitudinal axis of the reflector, wherein the shielding angle is configured to produce a reflector efficiency approaching 90 percent, in conjunction with a visual comfort probability index approaching 100 percent.

These and other aspects, features, steps and advantages can be further appreciated from the accompanying figures and description of certain illustrative embodiments.

BRIEF DESCRIPTION OF THE DRAWING FIGURES

DETAILED DESCRIPTION OF THE ILLUSTRATIVE EMBODIMENTS

By way of overview and introduction, presented and described are embodiments of a lighting fixture that utilizes a light emitting diode ("LED") wafer, having an array of light-emitting elements, as a light source.

LEDs have been replacing incandescent and fluorescent lights in a number of applications including traffic lights, flashlights, counter work space lighting, and low-level path lighting. Recent developments in solid state electronics have lead to the production of LED wafer arrays (referred to as a LED light engine) that can be as bright as a halogen bulb, while using about half the power. For instance, a light engine available from Lamina Ceramics, Inc. of Westhampton, N.J., can deliver 95 lumens at just over 5 Watt power consumption—this is about the brightness of a 10 Watt halogen bulb. Other light engines are available, and the invention is not so limited as to be restricted to use the aforementioned light engine, or to be of a specific brightness.

LED light engines are rated to last 100,000 hours of use, with a half-power output degradation LED life of 50,000 hours, or about eight years under typical usage. This rating exceeds the life expectancy ratings for incandescent, halogen, and even fluorescent bulbs. Light engines are also advantageous because they do not produce UV emissions, which are harmful to fabric, carpeting, art works, documents, etc.

The light engine includes a high thermal conductivity substrate (e.g., a metal-clad PCB), a plurality of light-emitting-diode semiconductor devices mechanically connected to the substrate, and a substantially transparent polymeric encapsulant (e.g., optical-grade silicone) disposed on the plurality of LED devices. U.S. Pat. No. 6,942,360 to Chou et al., issued Sep. 13, 2005 and titled "Methods and Apparatus For An LED Light Engine" discloses describes such light engines, as is known in the art.

Light engines operate at a DC voltage that is regulated to remove voltage ripple and transient spikes. To provide this regulated DC voltage, a LED driver unit is provided between the light engine and the external supply of electrical power (typically 115 Volts at 60 Hertz in the U.S.).

Advances have introduced light engines that produce the same color temperature as the prior art incandescent, fluorescent, and halogen bulbs. As is known in the art, color temperature is a rating that characterizes the spectral properties of a light source. Color temperature is determined by comparing the light source's hue to a theoretical black body radiator. The rating for color temperature is the temperature (in degrees Kelvin) at which a heated black body radiator provides the same hue as the light source.

Figure 1:
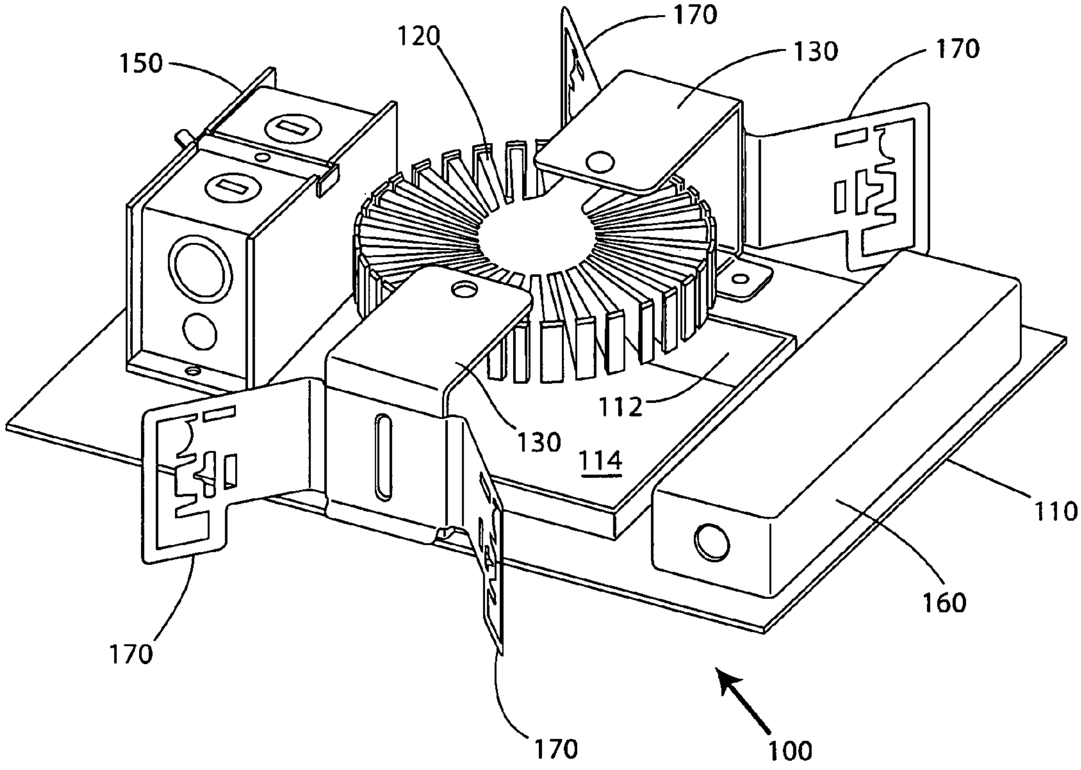
FIG. 1 is a top perspective view of an embodiment of the present invention.
Figure 2:
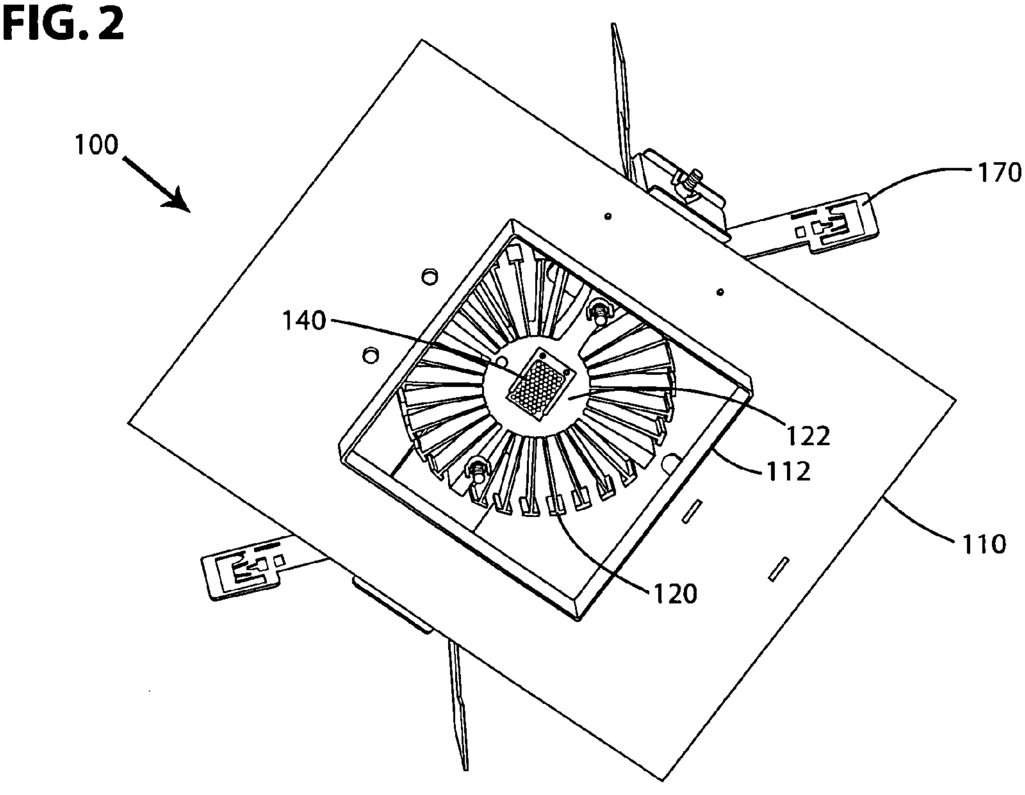
FIG. 2 is a bottom perspective view of the embodiment of FIG. 1.

FIG. 1 is a top perspective view of a lighting fixture 100 in accordance with an embodiment of the present invention. A holding plate 110 has an inner aperture 114 and acts as the mounting base for the various components of the lighting fixture 100. A heat sink 120 is provided to draw heat away from the LED wafer 140 (FIG. 2). The mass and configuration of the heat sink is selected, as is known in the art, to sink the heat generated by the LED wafer. Such selection is based on the particular operating parameters and requirements of a specific LED wafer, and will vary accordingly with these criteria. So as to assure proper thermal connection between the LED wafer 140 and the heat sink, a lamp support surface 122 (FIG. 2) is formed on the heat sink. For best operation (e.g., conduction of heat between the LED wafer and heat sink), the lamp support surface should be smooth and not treated or painted. The heat sink 120 itself can have a black anodized finish.

The heat sink 120 is mechanically supported from the holding plate 110. FIG. 1 shows an exemplar mounting bracket 130 that is connected to the heat sink and to the holding plate. Other mechanisms, as is known in the art, can also be used to support the heat sink, for instance posts set between the heat sink and holding plate can mechanically support the heat sink from the holding plate. Indeed with proper thermal analysis, which is within the scope of a person of ordinary skill, a combined heat sink/holding plate unit can be used. This combined unit can be formed integrally, or by direct assembly of the various components.

The LED wafer light engine 140 is mounted on lamp support surface 122. The surface 122 is prepared to provide a high thermal conductivity to the light engine's high thermal conductivity substrate. As is known in the art, a thermal paste or heat sink compound can be used to improve the quality of the thermal conductivity.

In one embodiment, mounted to the holding plate is a junction box 150 and a LED driver housing 160. The junction box 150 provides a safe receptacle for making wiring connections between an outside source of electrical power (not shown) and the wiring within the lighting fixture 100. The LED driver housing 160 provides a container in which can be mounted the LED driver unit. Wiring connected to the LED driver is fed into the junction box, where it is connected to the external source of power.

However, the invention itself is not so limited. The external source of power can be a well-regulated DC voltage suitable to operate the LED wafer 140. Under such an arrangement, a lamp cord two-conductor wire can be fed from contacts on the LED wafer into the junction box 150. Within the junction box, connection can be made to the external DC voltage. Naturally, such an embodiment would not require the LED driver housing 160.

In certain embodiments, e.g., a recessed lighting fixture, a rail support bracket 170 is slideably attached to the holding plate. The rail support bracket is used to mount the lighting fixture 100 to a wall stud, ceiling joist, floor joist, or some other structure. FIG. 1 depicts the rail support bracket 170 attached via a threaded screw and wing nut. A slot on the bracket allows for movement along one axis. Other slot arrangements can provide movement in other axes. The rail support bracket 170 can have preformed fold lines that make it easy to reposition the rail support bracket. The bracket is slid, bent and positioned so as to closely mate to the aforementioned structure so as to securely mount the lighting fixture 100. To facilitate mounting of the lighting fixture 100, an end of the rail support bracket, distal from the mounting plate, can have a configuration of holes, slots, and openings. An exemplar of such a distal end is depicted in FIG. 1.

In other embodiments of the present invention, for instance, say free standing, surface mount, floor, or track lighting embodiments the presence of a rail support bracket 170 is not needed. Instead, other brackets and/or connective structure is used to achieve the stable positioning of the lighting fixture.

Figure 5:
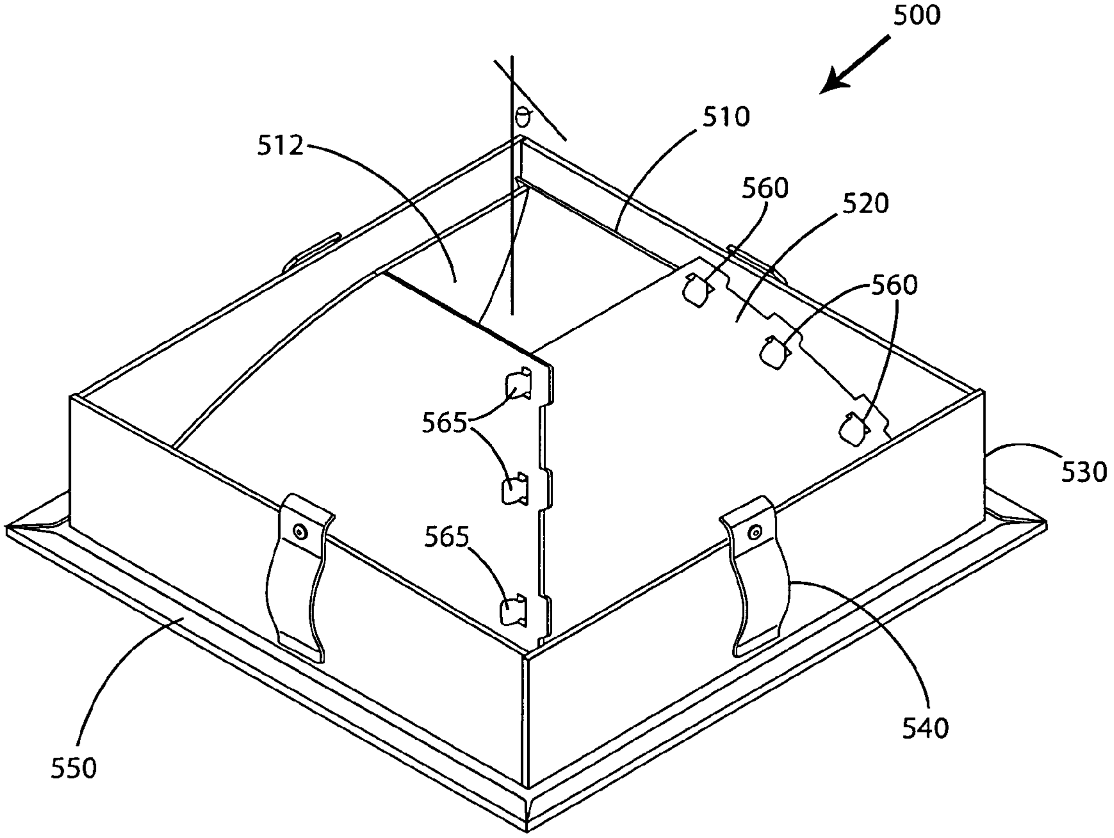
FIG. 5 is a perspective view of an embodiment of a reflector in accordance with the present invention.

FIG. 5 depicts a perspective view of a reflector 500. In this embodiment, the reflector 500 includes a frame 550 and a flange 530. The frame 550 and flange 530 extend about the reflector. The reflector 500 is shown as a rectangle form, but the present invention is not limited to reflectors having just this shape. For instance, the reflector 500 can have a cross section which is square, circular, oval, etc.

The reflector includes reflecting sides 520, inner sides of which form a reflecting surface that guides the light emanating from the LED wafer 140. Depicted in FIG. 5 is a rectangular/square-shaped embodiment of reflector 500. The reflecting sides 520 are formed from four identical shaped pieces. Each piece has a series of longitudinal slots 560 formed along one longitudinal end. At the opposing end of each reflecting side 520, a tab 565 is formed. The reflecting sides 520 are assembled by insertion of tabs 565 of one reflecting side through a corresponding slot 560 in an adjacent reflecting side.

Retainer clips 540 are attached to the flange 530, and are dispersed about the periphery of the flange. Reflector 500 has a first end 510 with a first opening 512, and a second end 515 with a second opening 517 (not shown). The first end 510 is mounted proximal to the heat sink 120, and the second end is mounted distal there from. A longitudinal axis between the proximal end and distal end intersects a plane containing the holding plate to form an angle. The intersecting angle can be 90°, or some less acute angle. By adjusting the intersecting angle, the beam of light provided by the lighting fixture 100 can be directed outward from aperture 114.

In one embodiment, the holding plate 110 includes a flange 112 about the edge of aperture 114. The reflector 500 is positioned so that the first end 510 is proximal, or touching, the lamp support surface 122, and the distal second end 515 extends from the heat sink and through the aperture 114. The reflector retainer clips 540 engage the flange 112 so as to hold the reflector 500 in place.

A longitudinal axis extending from the first end 510 to the second end 515 forms a shielding angle θ with the inner surfaces of reflecting sides 520. The shielding angle correlates to the efficiency and to the visual comfort probability index of the reflector 500, and thus, the entire lighting fixture 100. As is known in the art, for the short distance between the first opening 512 and the second opening 517 the reflecting surfaces 520 approximate a parabolic shape having a certain ratio of its focus-to-diameter (f/d). This f/d ratio determines how efficiently the light is directed by the reflector 500 from the LED wafer 140 surface source to the exterior space beyond the second opening 517, which is distal from the light source. Reflector 500 has a high shielding angle θ that approaches a reflector efficiency of about 90 percent, and a visual comfort probability index approaching 100 percent. Thus, adding to the overall efficiency and ambient comfort of the lighting fixture 100.

This high efficiency is partially due to the uni-hemispherical light emanation of the LED Wafer. Because light radiates in only one hemisphere, the shielding angle θ can be greater, thus rendering a light source that is almost completely shielded except for angles that are almost on-axis.

The Illuminating Engineering Society ("IES") defines Visual Comfort Probability (VCP) as referring to the number of people (expressed as a percentage) that feel comfortable in an environment illuminated by a specific luminaire. The luminaire efficiency is defined by the IES to be the ratio of the flux (lumens) emitted by a luminaire to that emitted by the lamp or lamps used therein. As is known in the art, the visual comfort of a lighting fixture has many factors (e.g., room size and shape, surface reflectance, illumination level, luminaire type, its size and light distribution, etc.). The IES has developed a comprehensive standard procedure for evaluating glare discomfort. The resulting quantification of this procedure is known as the VCP of the lighting system. In its simplest form, the procedure involves measuring the light distribution radiating from the lighting fixture, extrapolating the light distribution pattern for various room condition models (e.g., size, height, and surface reflectance), and determining the VCP index for the lighting fixture.

Applying the above standardized procedure to a recessed lighting fixture embodiment of the present invention yielded results of a VCP index of 99% in both 0° and 90° planes for room sizes ranging from 20×20 feet up to 100×100 feet having 8.5 foot ceilings. The VCP index dropped to about 90% when the ceiling height model was increased to 10 feet.

Such results are unexpected and not suggested by what is known in the art. Typically, a highly efficient reflector causes a decrease in the VCP index. However, the present invention is able to achieve both high efficiency in a reflector along with a high VCP index. These results were achievable because of the combination of the LED wafer's light distribution and the reflector shape and form.

Figure 3:
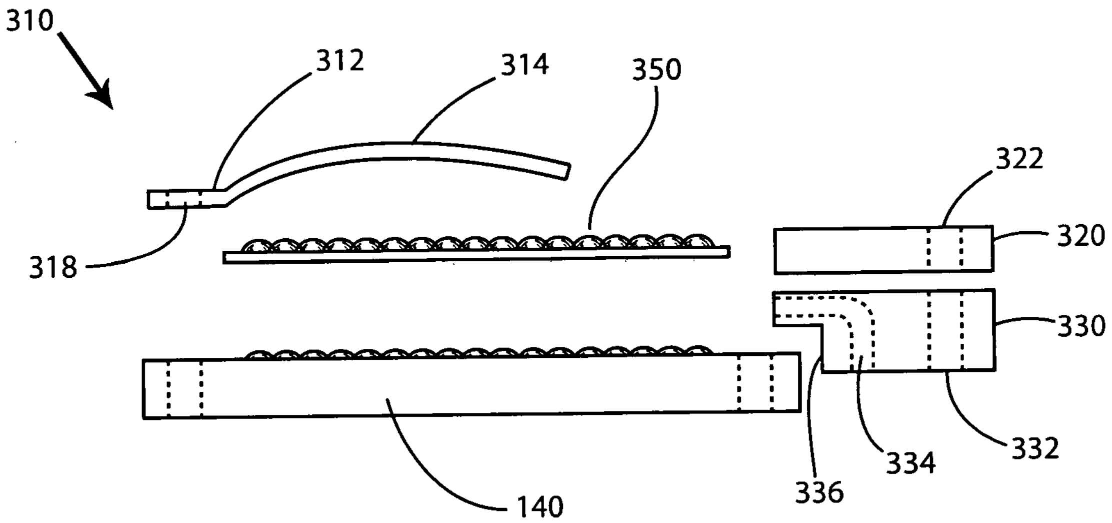
FIG. 3 is a side view of an embodiment of a LED wafer mounting assembly in accordance with the present invention.
Figure 4:
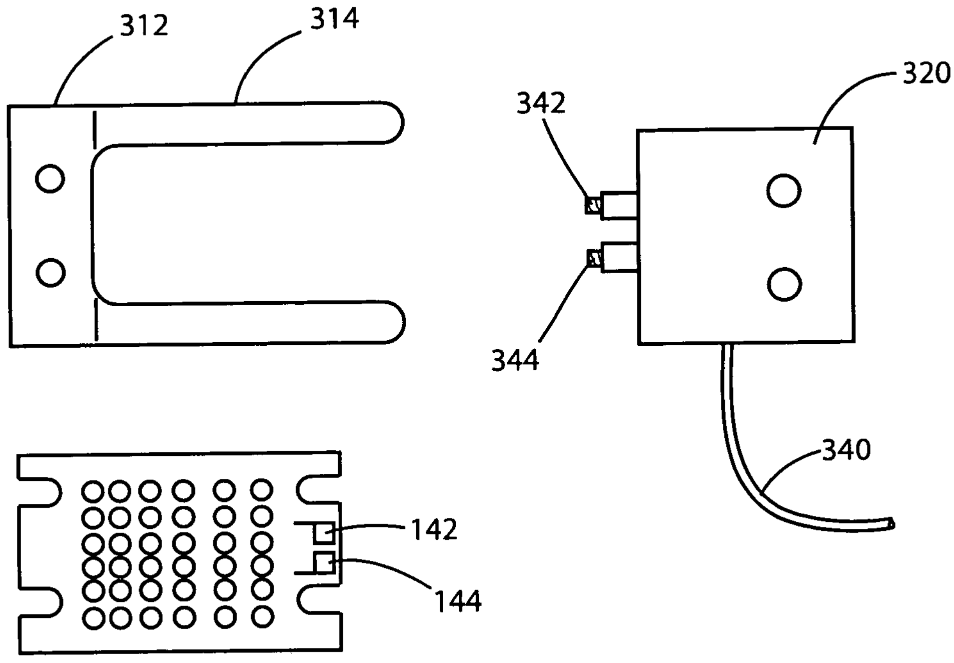
FIG. 4 is a top view of the assembly illustrated in FIG. 3.

An embodiment of the invention incorporates a lamp holder design that simplifies maintenance of the lighting fixture 100. Although light engines have a greater life expectancy than other bulbs, they do eventually need to be replaced. FIGS. 3 and 4 depict an embodiment of a LED wafer mounting assembly 300. The assembly 300 secures the LED wafer 140 to the lamp support surface 122. The design of the mounting assembly 300 permits for easy replacement of the LED wafer, and does not incorporate any glue, solder, rivet, or other non-readily removable affixation. In another embodiment, the heat sink 120, and LED wafer 140 are constructed to be removable as a single unit for removal from the lighting fixture so that the LED wafer can be replaced in a more convenient manner and location.

A mounting clip 310 has a main portion 312 and at least one spring element 314. The main portion is mechanically compressed, for instance by screws tightened into threaded holes in the heat sink 120, against one edge of the LED wafer 140. As the main portion is compressed, the spring element 314 is pressed against the LED wafer, and exerts a pressure against the LED wafer towards the heat sink. The main portion can have through holes 318 to accommodate the screws.

At another end of the LED wafer 140, the mounting assembly 300 positions a lamp holder block 320 and an isolation member 330. The isolation member 330 is insulative and is disposed between the lamp holder block 320 and the LED wafer 140. The lamp holder block and isolation member apply pressure to the LED wafer to secure that end of the wafer to the heat sink. Each of the lamp holder block 320 and the isolation member 330 can have respective through holes 322, 332.

The isolation member 330 also has a wiring channel 334. The wiring channel can be within the isolation member, as shown, or can be achieved as a groove along the surface of the isolation member. In one embodiment, the LED wafer 140 has electrical contact pads 142, 144 on the surface opposite its substrate. These contact pads are the power connection for the light engine. A lamp cord 340 is positioned along the wiring channel 334. The lamp cord is a two-conductor cord, where the ends of the conductors are prepared in a manner to make contact with the contact pads 142, 144. The ends can have terminal spades, be bare, or covered with low resistance plating. The distal end of the lamp cord is attached to the source of electrical power for the LED wafer 140, whether to a LED driver unit mounted within the driver unit housing 160, or directly to an external source provided with connections in the junction box 150.

The contact pads and terminal ends of the lamp cord can be covered with a non-corroding surface to maintain the longevity of the connector contact by reducing oxidation.

In another embodiment, a cable connector is provided in electrical contact with the contact pads 142, 144. Internal to the cable connector are contacts which are designed to mate with a complementary designed contact in a second cable connector, which is in electrical contact with the two-conductor lamp cord 340. Such complementary connectors can be a telephone connector, a bayonet connector, a sexless connector, and/or a threaded connector, as is known in the art.

The isolation member 330 is configured with a notch on its inner surface where it mates with the LED wafer 140. This notch is sized to the thickness of the substrate and provides a surface which compresses the lamp cord conductors to the contact pads 142, 144. The notch also reduces the height footprint of the mounting assembly 300, which results in a less obstructed field of view for the light engine, and contributes to the overall efficiency of the lighting fixture 100.

A lens 350 can be provided above the LED wafer 140. The lens 350 is held in position by the mounting assembly 300, as described above. The lens 350 focuses the planar light source of the light engine so as to evenly illuminate the beam pattern.

A housing (not shown) can be provided to enclose the lighting fixture 100. The housing attaches to the mounting plate and forms an enclosure that isolates the lighting fixture 100 components from the mounting location. Typically, as described above, the lighting fixture 100 is mounted in a cavity which can contain insulation.

The present invention results in a lighting fixture that has a reduced profile, which makes it advantageous to use in cavities of small depth. Such cavities are becoming more and more frequent in new construction, where extra floors are added to buildings by reducing the cavity height between floors.

Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

I claim:

1. A lighting fixture comprising:

a holding plate including a flange defining an aperture in the holding plate;

a heat sink including a lamp support surface;

at least one mounting bracket interconnecting the heat sink to the holding plate, wherein the lamp support surface is positioned opposed to the holding plate aperture; and an LED wafer, which includes a first surface having a plurality of light emitting LEDs, in thermal communication with the lamp support surface; and a reflector, having a proximal end defining a first opening and a distal end defining a second opening, mechanically coupled to the holding plate flange such that a longitudinal axis between the proximal end and distal end intersects a plane containing the holding plate;

wherein the reflector has a shielding angle θ measured with respect to a central longitudinal axis of the reflector, wherein the shielding angle is configured to produce a reflector efficiency approaching 90 percent and a visual comfort probability index approaching 100 percent.

2. The lighting fixture of claim 1, further comprising a LED wafer mounting assembly operable to secure the LED wafer to the lamp support surface, the LED wafer mounting assembly comprising:

a mounting clip having a main portion with though holes, and a spring element extending from the main portion;

a lamp holder block having through holes; and an insulative isolation member with through holes;

wherein the mounting clip main portion secures a first edge of the LED wafer to the lamp support surface, the spring element is configured to apply pressure against the LED wafer in a direction towards the heat sink, and wherein the lamp holder block, with the isolation member positioned between the block and the LED wafer, secures a second edge of the LED wafer to the lamp support surface.

3. The lighting fixture of claim 2, wherein the isolation member further includes a notch dimensioned so as to accept the second edge of the LED wafer.

4. The lighting fixture of claim 1, wherein the LED wafer further includes a pair of conductive contact pads, and the isolation member further includes a wiring channel, the lighting fixture further comprising:

a lamp cord including a pair of contact wires therein, each wire having a distal end coupled to a source of electrical energy, and a proximal end in electrical communication with the contact pads;

wherein a portion of the lamp cord close to the proximal end passes though the isolation member wiring channel.

5. The lighting fixture of claim 4, wherein the source of electrical energy is a LED driver unit.

6. The lighting fixture of claim 4, further comprising a complementary mating connector pair, wherein a first member of the pair is in electrical connection with the contact pads and a second member of the pair is in electrical connection with the pair of contact wires so as to achieve the electrical communication.

7. The lighting fixture of claim 6, wherein the complementary mating connector pair is formed from one of a telephone connector, a bayonet connector, a sexless connector, and a threaded connector.

8. The lighting fixture of claim 1, further comprising a junction box and a LED driver unit housing mounted on the holding plate.

9. The lighting fixture of claim 1, further comprising a rail support bracket coupled to the holding plate.

10. The lighting fixture of claim 1, further comprising a lens positioned over the LED wafer first surface.

11. The lighting fixture of claim 1, further comprising a housing enclosure attached to the holding plate, wherein the housing enclosure and holding plate form a container.

12. The lighting fixture of claim 1, wherein the lighting fixture is configured to be one of a recessed, free standing, surface mount, floor, and track lighting unit.

13. A lighting fixture comprising:

a holding plate having an outer perimeter edge and an inner perimeter edge, the inner perimeter edge defining an aperture in the holding plate;

a heat sink, which includes a lamp support surface, mechanically coupled to the holding plate, wherein the lamp support surface is positioned opposed to the holding plate aperture; and a LED wafer, which includes a first surface having a plurality of light emitting LEDs, in thermal communication with the lamp support surface; and a reflector, having a proximal end defining a first opening and a distal end defining a second opening, mechanically positioned within the holding plate aperture such that a longitudinal axis between the proximal end and distal end intersects a plane containing the holding plate;

wherein the reflector has a shielding angle θ measured with respect to a central longitudinal axis of the reflector, wherein the shielding angle is configured to produce a reflector efficiency approaching 90 percent and a visual probability index approaching 100 percent.

14. The lighting fixture of claim 13, further comprising a LED wafer mounting assembly operable to secure the LED wafer to the lamp support surface, the LED wafer mounting assembly comprising:

a mounting clip having a main portion and a spring element extending from the main portion;

a lamp holder block; and an insulative isolation member;

wherein the mounting clip main portion is configured to be mounted to the heat sink so as to secure a first edge of the LED wafer to the lamp support surface, and the spring element is configured to apply pressure against the LED wafer in a direction towards the heat sink, and wherein the lamp holder block, with the isolation member positioned between the block and the LED wafer, is configured to be mounted to the heat sink so as to secure a second edge of the LED wafer to the lamp support surface.

15. The lighting fixture of claim 14, wherein the isolation member further includes a notch dimensioned so as to accept the second edge of the LED wafer.

16. The lighting fixture of claim 13, wherein the LED wafer further includes a pair of conductive contact pads, and the isolation member further includes a wiring channel, the lighting fixture further comprising:

a lamp cord including a pair of contact wires therein, each wire having a distal end coupled to a source of electrical energy, and a proximal end in electrical contact with the contact pads;

wherein a portion of the lamp cord close to the proximal end passes through the isolation member wiring channel.

17. The lighting fixture of claim 16, wherein the source of electrical energy is a LED driver unit.

18. The lighting fixture of claim 16, further comprising a complementary mating connector pair, wherein a first member of the pair is in electrical connection with the contact pads and a second member of the pair is in electrical connection with the pair of contact wires so as to achieve the electrical communication.

19. The lighting fixture of claim 18, wherein the complementary mating connector pair is formed from one of a telephone connector, a bayonet connector, a sexless connector, and a threaded connector.

20. The lighting fixture of claim 13, further comprising a junction box and a LED driver unit housing mounted on the holding plate.

21. The lighting fixture of claim 13, further comprising a rail support bracket mechanically coupled to the holding plate.

22. The lighting fixture of claim 13, further comprising a lens positioned over the LED wafer first surface.

23. The lighting fixture of claim 13, further comprising a housing enclosure attached to the holding plate, wherein the housing enclosure and holding plate form a container.

24. The lighting fixture of claim 13, wherein the lighting fixture is configured to be one of a recessed, free standing, surface mount, floor, and track lighting unit.

* * * * *